United States Patent [19]

Lockwood et al.

[11] 4,226,210
[45] Oct. 7, 1980

[54] ABALONE MARICULTURE

[75] Inventors: George S. Lockwood, Carmel Valley; Fred T. Shultz, Sonoma; Gerrit Bevelander, Carmel, all of Calif.

[73] Assignee: Monterey Abalone Farms, Monterey, Calif.

[21] Appl. No.: 955,944

[22] Filed: Oct. 30, 1978

[51] Int. Cl.³ .................................................. A01K 61/00
[52] U.S. Cl. ........................................................ 119/4
[58] Field of Search ................................... 119/2, 3, 4

[56] References Cited

U.S. PATENT DOCUMENTS

| | | | |
|---|---|---|---|
| 2,302,336 | 11/1942 | MacDonald | 119/2 |
| 2,944,513 | 7/1960 | Keely | 119/3 |
| 3,724,423 | 4/1973 | Day et al. | 119/4 |
| 3,884,186 | 5/1975 | Hickey | 119/3 |
| 3,985,101 | 1/1980 | Thompson | 119/2 |
| 4,078,521 | 3/1978 | Laubier | 119/2 |
| 4,182,270 | 1/1980 | Fourcher | 119/4 |

Primary Examiner—Hugh R. Chamblee
Attorney, Agent, or Firm—Christie, Parker & Hale

[57] ABSTRACT

A process for culturing abalone (phylum Mollusca, class Gastropoda, family Haliotidae); other gastropod molluscs including, but not limited to, conch (class Gastropoda; genera Strombus, Cassis, Charonia and others), Chilean "loco" (*Concholepas, concholepas*); sea urchins (phylum Echinodermata, class Echinoidea, order Cidaroidea) and other marine and aquatic motile benthic animals of economic and scientific importance in which larvae, when sufficiently developed to settle from swimming to crawling animals, are introduced into a bath of relatively pure water. Preconditioned settlement surfaces are provided in the bath that encourage the settling and metamorphosis processes and support life thereafter. The larvae are preferably introduced into the water in time-spaced batches, food is supplied, high quality water is supplied, waste products and unwanted detritus are continuously removed. Food may be grown in-situ and high quality water levels may be assured by photosynthesis involving exposing phytoplankton that is growing upon surfaces in the bath to artificially supplied light.

74 Claims, 4 Drawing Figures

Fig. 4

ABALONE MARICULTURE

FIELD OF THE INVENTION

This invention relates to the culturing and artificial embodiment of abalone (phylum Mollusca, class Gastropoda, family Haliotidae); other gastropod molluscs including, but not limited to, conch (class Gastropoda; genera Strombus, Cassis, Charonia and others), Chilean "loco" (*Concholepas, concholepas*); sea urchins (phylum Echinodermata, class Echinoidea, order Cidaroidea) and other marine and aquatic motile benthic animals of economic and scientific importance.

BACKGROUND OF THE INVENTION

Because of the primary commercial importance of abalone among marine animals as classified above, the invention is described with specific relation to abalone culture, although it is not intended to be so limited.

Many species of abalone and other forms of edible shellfish in the natural state are rapidly being depleted by predators, pollution, and commercial and sport harvesting, to the point that there is no longer an adequate source of these shellfish to satisfy world demand. The price of edible abalone meat has escalated seven-fold in the last ten years.

The normal life cycle of an abalone starts with a spawning process involving the dissemination of eggs by a female into a seawater environment and subsequent fertilization by male sperm. Spawning has been successfully introduced in commercial mariculture operations in Japan and the United States.

The fertilized abalone eggs, which are about 150 microns in diameter, undergo several stages of development in the first 24 to 36 hours, and then hatch to become free-swimming larvae. These larvae hatch without a protective shell, but within approximately six hours an initial shell is developed. The ability of the larvae to swim is provided by a velum, which includes many hairlike cilia that beat rapidly to propel the animal through the water. During this larval stage, it is believed that the primary source of nutrition is obtained from the egg yolk still contained within the body of the larva. Over an approximately four-day period, under controlled conditions, and this time period may be longer in nature, most of the larvae undergo physiological and morphological development, including the development of a foot, after which they begin seeking a suitable surface upon which to settle and metamorphose. This foot provides a means to crawl upon hard surfaces, and when a suitable surface is found, they attach to the surface, lose their velum and then begin to metamorphose from a larval to a juvenile abalone form. This process of metamorphosis, which involves a number of complex physiological and morphological changes occupies several days. The larvae, which are about 150 microns in greatest dimension at the time of hatching, grow to an approximate size of 250 microns in the four-day period while they are free-swimming.

When the swimming larvae reach the stage of development prior to settling which, as noted above, occurs in approximately four days, they begin to search for a suitable substrate upon which to settle. Upon sensing a suitable surface, a larva will settle and change from a swimming animal to a surface crawling animal, followed by the initiation of a number of other changes that result in the formation of a juvenile organism and the commencement of active feeding.

This application is directed to procedures for optimizing the settling and metamorphosis of abalone larvae and the survival and rapid growth of the young settled animals in mariculture conditions.

In nature, when the larvae are competent to metamorphose, they select suitable surfaces upon which to settle by temporarily ceasing to manipulate their swimming mechanism, thereby allowing gravity to gently pull their bodies to the ocean floor. When a larva settles upon a horizontal surface on the sea floor, it extends its newly developed foot and attempts to attach itself to the solid substrate upon which it has landed. Should it find this surface to be biologically, chemically or physically unsuitable, it again manipulates its swimming mechanism and swims upward into the water column to repeat the process. When a larva finds a surface with suitable characteristics, it settles and rejects its velum and becomes a crawling animal. The searching process for a substrate in good culture conditions usually begins on the fourth day after hatching. It has been observed, however, that the searching process can last for as long as 30 days if suitable substrate conditions are not available.

The 60-day period immediately following settlement involves a critical period in the abalone's life. As soon as a larva settles and changes from a swimming to a crawling snail-like gastropod, it actively moves about on its settlement surface and begins feeding. For the first three to seven days, the young post-larval animal ingests bacteria, yeast, fungi, protozoa, and possibly other microorganisms generally less than five microns in size. At this state, the abalone's mouth is a small, ill-defined opening incapable of ingesting larger size particles.

During the first five to ten days of growth, the animal's mouth rapidly enlarges to a size capable of handling five to ten micron size phytoplankton that are ingested as the abalone crawls along the surface rasping food particles growing on this surface. During the next 60 days the young abalone continues to grow rapidly with the development of a mouth structure, which, at the end of this period, can ingest particles 200 microns or more in size. Many of the larvae, both in nature and cultured under mariculture conditions, fail to survive the first 60 days. Our mariculture process provides a substantial improvement over nature in survival rates during the critical 60-day period when we believe most young abalone perish, as well as improvements over other abalone culturing methods. Such prior art methods are described in the following publications:

1. "The Abalone Science and Its Propagation in Japan", Takashi Ino, (original title in Japanese, "Awabi To Sono Zoyoshoku"), Vol. 11 in Series on the Propagation of the Marine Products, 1966, published by Nippon Suisan Shigen Hogo Kyokai.

2. "Abalone", Masaaki Inoue, Vol. I in Marine Product Culture Data Book, 1976, published by Suisan Shuppan (Marine Printing).

3. "Laboratory Observations on the Early Growth of the Abalone, Haliotis Sorenseni, and the Effect of Temperature on Larval Development and Settling Success", David L. Leighton, published in Fishery Bulletin, Vol. 70, No. 2, 1972.

SUMMARY OF THE INVENTION

This application is directed to procedures for culturing abalone in growing tanks through this critical settling and metamorphosis process and during the early states of growth of the juvenile abalone. The process of the invention involves the provisions in the growing tank of surfaces upon which the abalone can settle, the preconditioning of these surfaces so as to induce the settlement and metamorphosis of larvae thereon and to provide food to the crawling animals that result, introducing larvae while still in the swimming stage into the tank with preconditioned settlement surfaces, circulating conditioned seawater through and within the tank to effect the removal of waste products therefrom, and controlling the biological balance in the tank to provide needed food and to limit the build-up of harmful components and conditions in the tank.

In a somewhat more specific sense, our process may be summarized as involving the following important steps or conditions:

1. The preparation and provision of carefully controlled and suitable settlement surfaces fully submerged in the tank used to settle and grow abalone;
2. The preparation and provision of a favorable ecological environment in the tank used to settle and grow abalone;
3. A programmed time-space introduction of larvae into the growing tank;
4. The removal of feces and other suspended and dissolved wastes, dead animals, and other undesirable detritus from the growing tank;
5. The careful control of water quality;
6. The introduction of appropriate food in an uncontaminated form for the juvenile abalone at different ages in the growing tank; and
7. The use of photosynthesis to provide good water quality and to grow food.

These several facets of the metamorphosis and growing process of the abalone are discussed below in relation to the accompanying drawings.

DETAILED DESCRIPTION OF THE INVENTION

The mariculture process of the invention is carried out in a confined body of relatively pure seawater, and, for convenience in describing the process, reference is made to the specific culture tank illustrated in the drawings. This particular growing tank is described in greater detail and claimed in copending application Ser. No. 935,872, filed Aug. 23, 1978, by the present inventors.

Figures 1, 2, 3:
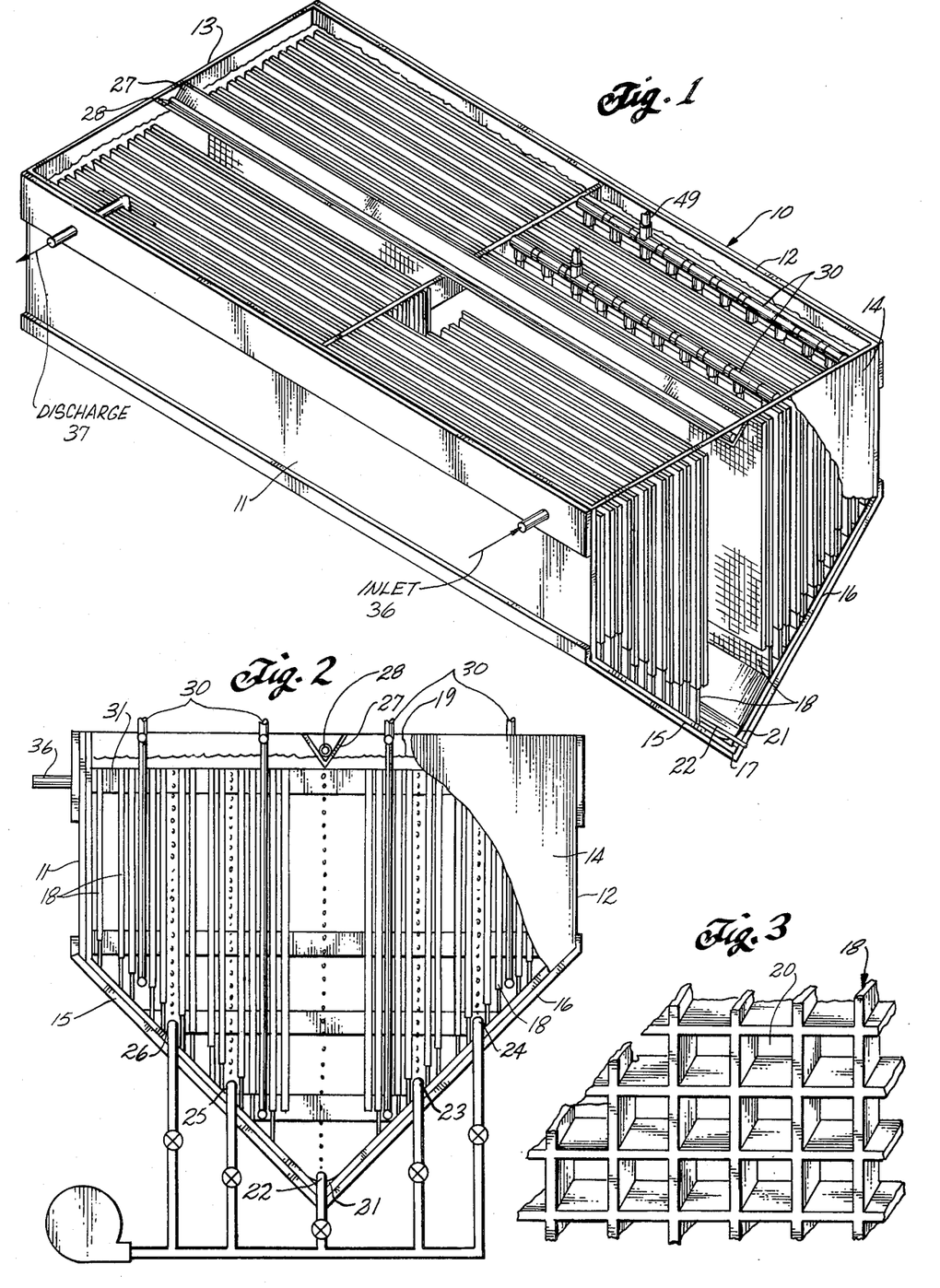
FIG. 1 is a perspective view of a growing tank with a portion of the near end removed for illustrative purposes.
FIG. 2 is an end elevation of the tank shown in FIG. 1, with the same portion of the near end plate removed.
FIG. 3 is an enlarged perspective view of a portion of the grid structure suspended in the tank of FIG. 1.

The apparatus shown in the drawings comprises a tank 10 having side walls 11, 12, end walls 13, 14, and bottom members 15 and 16 inclined to a lower apex 17 to form a V-shaped tank bottom. A plurality of grid sheets 18 are suspended vertically in the tank in a spaced parallel relationship extending from a few inches below the water surface 19 to approximately one-half an inch above the bottom members 15 and 16. The grid members are conveniently fabricated of smooth plastic, such as polyethylene, polystyrene, ABS, and polyvinylchloride, and provide a plurality of compartments 20, as shown most clearly in FIG. 3, that are open on two opposite sides to facilitate the free flow of water through them, and contain a large amount of surface area and a multitudinous number of corners. These submerged compartments provide in the tank a large area of approximately horizontal smooth settling and growing surfaces for the young abalone, to which reference has previously been made, a plurality of corners to which young abalone orient themselves, and a large amount of surface area for plants to attach and grow upon for food and for photosynthesis. Because these compartments and surfaces are submerged below the water level, the young abalone cannot conveniently crawl out of the tank, a serious problem with other abalone culturing systems.

It is important, as will become apparent in the further description of the process of the invention, to achieve vigorous water circulation in the tank so as to (1) minimize any accumulation of fecal matter, dead animals, and accumulations of food and other detritus, (2) move dissolved and suspended waste products away from the abalone, (3) deliver plant nutrients to the photosynthesizing phytoplankton, and (4) deliver food to the abalone. To this end, a curvilinear trough 21 is disposed along the apex 17 of the tank bottom, and a series of air bubbler tubes 22, 23, 24, 25 and 26 provide means for bubbling air through the body of water in the tank, thereby causing water movement. The periodic injection of air into and out of these air bubble tubes, either alone or in combination, results in vigorous water circulation within the tank, and water is circulated through the tank by pump means (not shown) through inlet and discharge ports 36, 37, respectively.

The grid structure shown in enlarged perspective view in FIG. 3 allows the water to readily flow, during such period of agitated water movement, across the grid sheet compartment surfaces upon which the abalone live and crawl. Dissolved waste products such as ammonia and carbon dioxide, solid feces and dead animals are thereby removed from the immediate environment of each young abalone, and fresh nutrients are supplied to the plants. In addition, suspended food particles are moved around the tank for immediate availability to the young abalone.

To further improve the circulation in the tank, a V-shaped deflector baffle 27 may be mounted between the end plates 12 and 14 at the longitudinal centerline of the tank, and arranged to penetrate the water-air interface to baffle the water flow induced by air bubbling. A tie rod 28 may be housed within the baffle 27 forming a structural tie between the end plates 13 and 14.

A number of removable light fixtures 30 are immersed in a vertical plane in the tank, each of which comprises a plurality of spaced, parallel, fluorescent lamp tubes 32 extending vertically from top to bottom of the tank for the purpose hereinafter described. Only a few of the light elements are shown, but it should be understood that the entire tank is provided with these fixtures in the manner described. One of the light fixtures is shown in perspective in FIG. 4. In addition to the lamps 32, the fixture includes interconnecting upper and lower tubular supports 40 and 42, respectively, tubular conduits 41 for housing the necessary wires 48, a flexible connector cable 49, and connector 50 for connection to a suitable circuit (not shown).

The growing tank design and its detailed functioning is described in detail in our above-referenced application Ser. No. 935,872.

The process of the invention begins with the provision and preparation of the settlement surfaces which, in the illustrated growing tank, comprises the grid sheets 18. It is apparent from a study of natural habitat of the abalone that in the process of settlement the young larvae are extremely selective. By investigating the nature of the submarine surfaces on which the abalone elect to settle, we have found have a microbiological community of one or more species of marine bacteria; yeast; fungi; small diatoms; amoeboid, ciliated, choanoflagellates and other stalked protozoa; and possibly other microorganisms within a size range of from one to five microns, when scattered upon smooth horizontal surfaces with a cell spacing in an approximate range of from 10–50 microns, will induce settlement and metamorphosis and provide food for the young abalone for the first 10 to 20 days of life as a crawling animal. A significantly greater density of these microorganisms on the settlement surfaces in a mariculture environment may induce settlement but will result in a high mortality in the young abalone. At the opposite extreme, substantially lesser densities of these microorganisms may result in settlement and metamorphosis, but will result in starvation. In order to induce settlement and to provide food for the settling animal, the microorganisms must not be greater than approximately five microns in size, and they are preferably approximately two to three microns in size.

Of further importance to the settlement process and metamorphoses, was the discovery that trails left by previously settled abalone on submerged surfaces will induce settlement and metamorphosis with a high degree of survival. A number of reasons may be ascribed to the affinity of the settling larvae to the abalone trails. These trails may contain a family of protein, mucopolysaccharide, and/or other compounds that may possess phermone characteristics and other select factors of biological activity which may be inducing, or aiding, settlement, metamorphosis and subsequent life. In addition, the passage of an abalone over the surface leaves a residue of the appropriate density of the desired microorganisms to satisfy the needs of the newly settling larvae as described above.

Accordingly, the settlement surfaces in the growing tanks are conditioned prior to larvae addition by flowing filtered seawater through the tank for approximately ten days, in the dark or under subdued light conditions. The seawater can be pumped from or near the surface of the ocean, and normally from a depth of 20 to 40 feet. To minimize the intrusion of foreign organisms, including worms and other predators, bacteria, phytoplankton, eggs and larvae of other organisms and detritus, into the growing bath, the water is first filtered through a sand filter, and then through a diatomaceous earth or other types of fine filters, to remove all particles of a size greater than about 30 microns and preferably larger than 10 microns. At the same time it is important not to exclude organisms of about 5 microns, or less, in size because protozoa and bacteria falling in this size range are needed in the biological community in the tank. Subsequently, the water is passed through a high energy ultraviolet sterilization unit to reduce the bacteria count to 100 cells per ml, or less, which may be one or two orders of magnitude below that found in the ocean adjacent a shoreline. The water introduced and circulated through the tank for the conditioning period is maintained in a temperature range between about 16° C. and 18° C. for the red abalone, *Haliotis rufescens*, and may be different for other species. After a period of approximately ten days, the settlement surfaces possess a population of microorganisms to which the settlement-prone larvae respond and metamorphose from a swimming larva to a crawling animal.

We have found that it is possible to culture bacteria, yeast, protozoa and other microorganisms separately and add them to a settling tank containing filtered and sterilized water before introducing the larvae in order to obtain properly conditioned surfaces. However, the above-described method is preferred.

A third method for preparing surfaces for settlement is to add Marine Broth 2216 (a product of Difco Laboratories, Detroit, Mich.) to the seawater tank in the amount of 0.04 to 0.4 gms of dehydrated medium per liter of seawater, without water circulating through the tank but with vigorous agitation as hereinbefore described. Other organic media can be used. After approximately three days, water is circulated through the tank for an additional two days and the surfaces are prepared for settlement. We prefer, however, to use the first method for preparing settling surfaces as described above.

Approximately 24 hours before the introduction of larvae, one or more species of phytoplankton, such as small (5–10 microns long) benthic diatoms, such as the class Navicula, are added to the tank. The time of this addition is not critical to the process; it can occur up to five days earlier or five days later in the sequence. Such diatoms exist widely in nature at locations where abalone are found and can be isolated and cultured using conventional techniques for culturing phytoplankton. The water flow and air bubble system are stopped for approximately eight hours, after addition, to allow these diatoms to settle out of the seawater bath upon the grid cubicle surfaces where they attach. It is important that the diatoms added at this stage either be cultured in a bacteria-free, or nearly bacteria-free, condition, or be suitably treated prior to introduction to the tank to obtain low bacteria counts and to minimize the number of species of bacteria, since care must be exercised not to introduce pathogenic bacteria or harmful fungi at this stage. It is also important that the diatoms selected for this first diatom addition be small enough (approximately 10 microns or less) to be ingested by the young abalone. Light energy and nutrients are applied to provide optimum growth and reproduction of the diatoms. These conditions support and enhance the very important photosynthesis function, hereinafter described in detail.

This controlled addition of a selected species of cultured diatoms just prior to or after settlement provides significant benefits to high early survival of the young abalone in contrast to culture systems where an assortment of wild diatoms are allowed to grow upon the settling surfaces prior to larvae addition. First, only usable food is introduced and surface area and plant nutrients are not wasted on growing food that cannot be immediately consumed. Secondly, in such uncontrolled or wild situations, some of the uneaten large diatom species tend to eliminate the desirable diatoms and often grow into a dense mat that adversely inhibits the mobility of the young abalone. In addition, such mats provide an excellent substrate for engendering the growth of worms and other predators of young abalone. These disadvantages are eliminated in our process.

During the first 60 days of a young abalone's crawling life, there is a high mortality due to numerous other causes. Genetics, bacteria, the quality of the settlement surfaces, the nature of the biological community thereon, water quality, and the quantity and quality of food are all factors that contribute to high early mortality. Our process has been developed to achieve optimum control over these factors.

One of the methods we have discovered to help reduce this high mortality involves the sequential addition of successive batches of larvae into a growing tank at intervals of approximately one week apart. The continuous addition of larvae over a period of a month or longer would be ideal, but, for practical means, we prefer to add larvae at weekly intervals. For the reasons noted above, the settlement and survival of the first larvae added to a mariculture medium is usually lower than the survival rate of subsequently added larvae. Some animals from the first larvae addition settle and survive and begin grazing the bacteria, protozoa, phytoplankton, and other microorganisms on the settlement surfaces, and leave a trail in the process of so doing. As discussed earlier, these trails provide attractive settlement surfaces for larvae added in subsequent installments, and are one of the reasons for the higher survival rate of later-added larvae.

It is also possible to add abalone that have been grown in other tanks to the settlement tank several days prior to the introduction of the first batch of larvae. We have found that animals as large as five centimeters in shell length can be used to precondition the settling surfaces, and the trails from these added abalone provide good settlement surfaces. While we prefer the multiple larvae addition procedure, we have on occasion used abalone in a size range of approximately 2 to 10 millimeters to graze and condition surfaces for settlement.

Many of the first batch of larvae added to the tank soon die, and their dead tissue provides a substrate for the proliferation of marine bacteria, some of which in and of themselves can be fatal to the young abalone previously introduced and settled as well as to subsequently added larvae. We have noticed that bacteria population explosions sometimes occur after the first introduction of larvae. In such cases, bacteria from the first dead animals may infect and kill many, if not most, of the remaining animals. However, bacteria feeding microorganisms, when present, such as ciliates and other protozoa, follow such bacteria population explosions with their own population increases and build a diverse environment of bacteria-consuming organisms that provide a good biological buffer that maintains bacteria populations at low levels. This ecologically balanced or buffered system can thereby handle the addition of further masses of abalone larvae and subsequent dead larvae tissue by controlling the resulting bacteria population levels to within tolerable limits. We have determined that the presence of a diverse population of bacteria controlling microorganisms is important for the early survival of young abalone. Such organisms, such as protozoa, can be isolated and cultured separately using conventional techniques and introduced with or immediately prior to the larvae, or, instead, allowed to grow up on their own within the tank. With water filtered as described above, a sufficient quantity of such bacteria feeding microorganisms are always present to provide for a good resulting population.

With each larvae addition, the survival rate improves as the system achieves a balanced or biologically buffered condition, and the population of young abalone in the tank increases until the point of maximum capacity is reached for a particular tank volume, submerged surface area, and available light energy. This capacity is in turn limited by food availability and water quality. This multiple settling technique, in addition to providing a much higher survival and population density than would be achieved by introducing the total number of larve at one time, also provides a more stabilized population of animals since there are animals from several different spawns settled into each tank. This is important since there are differences in growth rates, health, and inherited characteristics, from spawn to spawn, and in this fashion the animal population in a number of mariculture tanks can be made more predictably uniform.

In the practice of our invention we prefer to hatch the abalone eggs and develop the larvae in separate containers and seawater baths, as described in the abovementioned copending application, and not in the same containers and seawater baths used for settlement. However, it is possible to hatch eggs and develop the larvae in the herein-described tanks and seawater baths that are used for metamorphosis and initial growth of the juvenile abalone. Furthermore, larvae can be introduced into this process at earlier stages in development than described herein, in which case they continue to swim freely in the growing tanks until they are ready to change from swimming to crawling animals. We prefer, however, to conduct egg hatching and larval development operations separate from this process for settlement, metamorphosis and early growth.

An important aspect of the process of settlement, metamorphosis and growing of young abalone is water quality. We have described above the treatment of the seawater prior to introduction into the growing tank. The incoming seawater is treated and essentially the same manner during at least the settlement period and preferably throughout the first several weeks of abalone life. However, as the abalone becomes established, i.e., two or three weeks old, it is possible to use a lesser degree of filtration, removing particles and organisms of greater than about 50 microns in size. However, throughout the growing period contemplated by this invention, it continues to be important to maintain a relative constant water temperature which, in the case of the California red abalone, is preferably between about 16° C. and 18° C., but in no case should it exceed 20° C. for more than a few hours.

It is also important to take steps to control certain biological processes which occur in the tank itself. The young abalone which survive the settlement process grow rapidly and may increase in biomass eight-fold in the first ten days. During this time, most of the food protein ingested is digested and discharged as ammonia and feces, with most of the protein in the feces being rapidly converted by bacteria into additional ammonia. Also, the carbohydrates in the food and the feces are metabolized into carbon dioxide, and the tissue from the dying young abalone is converted into ammonia and carbon dioxide by bacteria. The production of ammonia, carbon dioxide, and other metabolites becomes very high soon after settlement.

Both ammonia and carbon dioxide are toxic to the abalone. For instance, we have found that concentrations of ammonia, even in a range as low as 50 to 100 parts per billion, injure the young animals. This resultant tissue damage decreases the abalone's resistance to the invasion of harmful bacteria and slows the rate of growth. Accordingly, therefore, it is highly important that the concentration of toxic metabolites be carefully controlled. For ammonia, we prefer to maintain concentrations below 50 parts per billion. The concentration of carbon dioxide can be controlled to acceptable levels by control of pH, and we prefer to maintain pH above about 7.8 for this purpose by photosyntheses. In addition, there may be other abalone metabolites that are toxic which are also controlled by the described photosynthesis procedures.

Because the production of ammonia and carbon dioxide is at least partially the result of bacterial decomposition of feces, dead animals and dead plant tissues, it is important to maintain a high degree of cleanliness in the culture environment. In addition, pathogenic bacteria can rapidly multiply in dead tissue and feces. In order to maintain a high degree of cleanliness, the growing tank is periodically and rigorously agitated with air by means of one or more of the air tubes 22, 23, 24, 25 and 26, thereby suspending and resuspending solid waste sediments so that they are removed by water flowing through the tank. Typically, air is introduced through tube 22 for two minutes out of every 16 minutes, and air is introduced at lesser intervals through tubes 22, 23, 24, 25 and 26 individually and in various combinations for two minutes every hour. Alternating air dispersion in such a manner prevents detritus from building up in pockets. Such detritus pockets provide a substrate for growing pathogenic bacteria and fungi; an environment engendering the growth of worms and other predators; locations for anaerobic conditions to occur that can produce toxic metabolites; and locations of low oxygen levels that can result in suffocation. A water flow rate through the tank to change the water volume at least every eight hours constitutes preferred practice. Periodic exchange of water in the tank is important but need not be continuous, and it is possible for the abalone to survive in the diverse biological conditions we have created for extended periods of time without exchanging the water.

Such use of air agitation serves other purposes. Dissolved and suspended wastes are moved away, and oxygen-rich water is brought to the young abalone. Food is dispersed through the tank. Plant nutrients necessary for photosynthesis are brought to the plant-covered growing surfaces, and oxygen can be maintained at proper levels by adding oxygen during periods of rapid metabolism by the abalone, and by stripping oxygen during periods of excess oxygen production by the photosynthesizing phytoplankton. We have found that the dissolved oxygen concentration should be between 75% and 100% of saturation.

An important feature of this invention is the use of submerged growing surfaces that provide a large amount of surface area per unit volume of water, that provide a large number of corners (which young abalone instinctively seek for protection), and that provide for a regular and complete flow of water around the young abalone as they live and crawl upon the submerged surfaces. Use of surfaces with cracks and crevices that collect dead material, and into which the young abalone can crawl, but that do not allow for ample water flow, will provide breeding grounds for pathogenic bacteria, fungi, worms and other predators, and result in the depletion of oxygen and in elevated concentrations of toxic compounds such as ammonia, carbon dioxide, and hydrogen sulfide.

A further control of toxic metabolites such as ammonia, and carbon dioxide (and possibly other compounds and elements), and other benefits, discussed below, is provided by photosynthesis, as presently noted. In the presence of adequate amounts of light energy, algae, such as benthic diatoms, will convert ammonia, carbon dioxide, and possibly other compounds and heavy metals into plant tissue, and thus remove them from a potential toxic condition by metabolizing them into food. With adequate amounts of light energy, plant life, and plant nutrients, ammonia can be maintained below 50 parts per billion and the pH of the seawater can be held above about 7.8.

The photosynthetic processes are also of value in removing toxic chemicals from ambient seawater before or soon after it is introduced to the abalone tanks. On some occasions, for instance, seawater being pumped from the ocean into our abalone growing tanks contains higher levels of ammonia and carbon dioxide than is desirable, and may also contain adversely high levels of other toxic compounds, such as heavy metals; pesticides; polychlorinated biphenols and other halogenated compounds; light aliphatic and aromatic hydrocarbons; and a wide variety of other known and unknown pollutants. Such toxic pollutants are often found in coastal waters near sewage outfalls and stream discharges containing municipal, industrial, and agricultural wastes. During photosynthesis, such chemicals may be absorbed by the growing plants along with ammonia and carbon dioxide, or in other ways be removed or altered in composition so as to eliminate or reduce their toxic effects. For instance, the photosynthesis of some microscopic phytoplankton may produce metabolites that act as chelators and bind free copper and other metallic ions into more complex structures, thereby reducing the toxic effects of the heavy metals.

A further benefit of photosynthesis may be the production of chemical compounds of phytoplankton that control the growth of bacteria and other harmful microorganisms. We believe that such antibiotic and biologically active metabolites of algae photosynthesis contribute to a healthy environment for high abalone survival and growth.

Besides requiring light energy, photosynthesizing plants must have adequate nutrients, such as nitrates, phosphates, vitamins and trace metals in molecular forms that are usable by the photosynthesizing plant. The trace metals of particular importance are boron, cobalt, iron, manganese and zinc, and the more important vitamins are B12, thiamine and biotin. Particularly when benthic diatom species such as Navicula are employed, adequate concentration of dissolved silicon must be present for good photosynthesis to occur. Sometimes natural seawater contains adequate levels of these necessary plant nutrients. Most of the time, however, we have found it necessary to add them to seawater in order to maintain ionic concentrations of nitrogen in the tank (preferably as a nitrate) at a level above about 5 microgram-atoms of nitrogen per liter of seawater, phosphorus (preferably as a phosphate) at a level above about 1 microgram-atoms of phosphorus per liter of seawater, and silicon (preferably as silicic acid) at a level above about 5 microgram-atoms of silicon per liter of seawater. Sometimes the addition of a chelating agent such as EDTA (at $10^{-6}$ molar concentration) stimulates good phytoplankton growth and high rates of photosynthesis. We have found that the maintenance of these nutrients in these concentrations results in the production of high quality food. Phytoplankton grown under these conditions possesses a high protein to carbon ratio.

An important aspect of the process of growing the young abalone is the provision of adequate amounts and types of good quality food. A major limitation to other abalone growing processes is inadequate food availability and poor food quality, resulting in slow growth, poor animal health and starvation. In our system we provide the correct species of food through additions from external sources as well as in-situ production within the tank by the maintenance of optimum amounts of light energy, plant nutrients, and surface area.

As noted above, the initial food for the young abalone are one or more species of bacteria, yeast, choanoflagellates and other protozoa, and other microscopic plants and organisms that are derived from seawater initially, then allowed to multiply on the settling surfaces. Care must be exercised to assure that excess growths of these items does not occur. However, a few days after metamorphosis, an abalone develops the capacity and need to ingest larger food particles such as small species of Navicula (5-10 microns long) as heretofore described, which we culture separately and add at least once a week, and sometimes more frequently. Beginning about the tenth day after the addition of the first larvae, other micro algae such as larger Navicula, Cylindrotheca, Phaedactylum, Melosira, Skeletonema and Grammatophera are added. These species of diatoms and algae are commonly found in the ocean where abalone grow, and are isolated and cultured using standard techiques. We have found that the young abalone grow well on these species of phytoplankton and will probably grow well on other species as long as the size of the particular species of phytoplankton is not too large for the small abalone to ingest at any particular stage of growth. After the first few days following settlement, during which food particles of 5 to 10 microns are indicated, the particle size may be gradually increased. However, during the first several weeks of growth we have found that an optimum particle size is in the region below about 30 microns. Species too large to be ingested at any given stage of growth of the young abalone should not be present in the tank. It is important that these phytoplankton that are so added be cultured either bacteria-free, or be suitably treated to minimize the number of species and concentration of bacteria. It is a presently preferred practice to expose the young abalone to a diet consisting primarily of entirely one or more species of Navicula to the substantial exclusion of other species of diatoms and algae.

The process of maintaining a controlled diet is an important feature of this invention. By adding only those species of diatoms that are ingestible and that provide good abalone growth, valuable growing surface area, growth nutrients and light are not wasted on less valuable species. In addition, dense mats of undesirable algae do not develop that would provide an environment favoring the growth of worms and other predators as well as becoming the collectors of decaying detritus and inhibiting good light penetration.

As mentioned above, photosynthesis plays an important part in the provision of an adequate amount of high quality food in the mariculture environment as well as in the control of ammonia, carbon dioxide, and other harmful chemicals, and in the possible production of beneficial compounds as discussed above. The various species of phytoplankton used for abalone food will absorb ammonia as a nitrogen nutrient and will absorb carbon dioxide as a carbon nutrient, as long as other required nutrients and light energy are available. In addition to absorbing ammonia and carbon dioxide rapidly and thereby maintaining these harmful compounds at acceptable low levels, the photosynthesis process, if adequate light energy and nutrients are present, also causes the food species to multiply to produce in-situ food protein, carbohydrates, and vitamins for the growing abalone.

We have found that the photosynthesis necessary to accomplish these objectives cannot be adequately provided by ambient light or even superambient light directed into the growing environment from the exterior of the growing tanks. It is essential that high levels of light intensity be supplied within the mariculture environment, and this is accomplished by the immersed light sources 30 in the tank 10. The immersion of the light sources provides greater lighting efficiency by avoiding reflection from the water-air surface and by minimizing absorption of light by the seawater by placing the light source close to the growing plants. Immersing the light source in a vertical plane parallel to the grid sheets also provides a more uniform distribution of light energy through the tank, since much of the light passes through the compartments of the adjacent grid sheets to the other grid sheets further removed from the light sources.

We have further found that the species of diatoms and algae, of importance in this process, thrive with a mixture of light spectra including at least about 15% in the blue range of approximately 430 to 490 nanometers. A fluorescent lamp marketed under the specification "Daylight" by U.S. manufacturers is apparently the most effective commercially available lamp. We have determined that this "Daylight" lamp, for a given input of electrical energy, produces greater rates of phytoplankton cell division, the fastest absorption of ammonia and carbon dioxide, nd the largest production of protein per unit time than any other commercially available fluorescent lamp. We believe that this is due to the large amount of light energy emitted in the blue spectra per watt of electrical energy input.

Other commercial fluorescent lamps, such as the one marketed under the specification "Cool White", are also effective, but to lesser extents.

It is best to provide the light energy from a plurality of sources so as to provide as uniform intensity throughout the tank as possible. We attempt to achieve a light intensity in the range of from 10 to 200 footcandles throughout the tank, although somewhat higher and lower values exist at some locations within the tank. For example, we use 64 fluorescent lamps in a 2000 liter tank that provide approximately 1500 watts of electrical energy (subsequently converted to light) for approximately $1.6 \times 10^6$ square centimeters of surface area used for growing phytoplankton. This is a power input of approximately one watt of electrical energy for every 1000 square centimeters of surface area. By immersing the fluorescent lamps to be in close proximity to the growing surfaces, we minimize light absorption in the seawater bath.

While we have found it more convenient and more efficient to place the fluorescent lamp sources directly into the abalone growing tank, it is also possible to achieve the same photosynthetic effects in other fashions. For instance, the young abalone can be contained in one tank and a separate tank that contains only phytoplankton or algae can be maintained as a photosynthetic scrubber. In this case, water is pumped from the abalone growing tank into the phytosynthesis tank and then back into the abalone tank. In addition, a separate photosynthesizing tank can be maintained upstream of the abalone growing tank after the initial sand and diatomaceous earth filters to purify the incoming water of toxic compounds and otherwise condition it for good abalone growth before adding the water to the abalone growing tanks.

Such external photosynthetic tanks can be constructed similar to the tanks herein described for abalone growing with submerged lamps, or the photosynthesizing micro and macro algae and phytoplankton can be grown on rocks, sand, plastic sheets, plastic grids, and other suitable substrates. The lamps can be submerged for greater efficiency as in the desired abalone tanks, or they can be mounted in an overhead, or some other fashion. We have found, however, that submerging the light sources directly into the abalone growing tank is more convenient and efficient and this remains our preferred, but not exclusive, method. It should also be noted that macro algae such as the California kelps (*Macrocystis pyferia*, or species of *Egregia*) can be used for photosynthesis, although in an abalone growing tank for the first 60-day period such large kelp is not a preferred food.

Because of the nature of the processes continuously underway in the mariculture tank involving the bacterial decomposition of feces, dead animals, and plant tissues into toxic carbon dioxide and ammonia, and the addition of these waste products from the metabolism of the young abalone, with the countervailing effects of photosynthesis on the concentrations of ammonia, carbon dioxide, and other toxic compounds, coupled with the production of food and beneficial compounds, a carefully controlled regimen of water circulation and sanitation is followed. As described above, the water in the tank is agitated by air for two minutes out of 16, with alternating circulation patterns thereby suspending and resuspending solid wastes so they are removed by the water flowing through the tank. In addition, period manual cleaning is necessary when pockets of detritus occur. The structure of the tank and the water circulation patterns must be such as to preclude accumulation of pockets and detritus, which may become sources of large numbers of harmful bacteria and the toxic metabolites that bacterial action can produce, may harbor worms and other predators, may encourage the depletion of oxygen, and in other ways detract from a healthy environment. This agitation is followed on a 24-hour per day basis.

SPECIFIC EMBODIMENT OF THE INVENTION

Although the process described in this application is not limited in its applicability to a particular growing tank structure and settling surface of the configurations as illustrated, a specific embodiment of the process is best described in relation to the illustrated tank and its ancillary equipment. Nor is this process description limited to abalone, since other motile benthic animals may be cultured using this technique. If we employ a 2,000 liter tank with approximately 400,000 square centimeters of horizontal surface area, i.e., a rectangular tank approximately 240 centimeters long by 118 centimeters wide with a sloping bottom that is 100 centimeters deep at the central apex, then such a tank may be provided with approximately 60 laterally spaced, longitudinally extending grid structures of the type identified by the number 18 in FIG. 3, in which each grid cubicle dimension is approximately 1.25 centimeters. These grid sheets are completely submerged in the tank.

With a tank of this configuration, a preferred embodiment of the invention is as follows:

1. Flowing seawater is passed through a sand filter and a diatomaceous earth filter to remove therefrom most particles 10 microns in size or larger. The water is then passed through a high energy ultraviolet sterilization unit to reduce the bacteria count by approximately two orders of magnitude from the levels sometimes found in the ocean. A bacteria count of approximately 100 cells per milliliter is acceptable. Water of this character, and conditioned to a temperature between about 16° C. and 18° C., is passed through the tank continuously at a rate of approximately four liters per minute for approximately ten days to build up on the surfaces, particularly the horizontal surfaces of the grid cubicles, a microbiological community of marine bacteria, yeast, choanoflagellates, protozoa, and small diatoms with an average cell spacing of 10 to 50 microns.

2. On the day before larval introduction, one or more species of small diatoms, such as various species of *Navicula*, are added to the tank and allowed to settle upon the horizontal surfaces of the grid sheets. Approximately $2 \times 10^{11}$ diatom cells are added at this time. This quantity of diatoms will provide an approximately average spacing between cells of 50 microns. It is important that these diatoms be previously grown under bacteria-free conditions, or treated to obtain low bacteria counts, before addition to the settlement tanks.

3. During and after the addition of diatoms and other foods, both prior to and after settlement, various nutrients, as previously described, are also added to the tank in sufficient quantity to insure optimum photosynthesis, to support growth of large amounts of high quality food, and to insure proper water quality.

4. After the ten-day conditioning period, abalone larvae are introduced to the tank in four or more batches of approximately 100,000 larvae each, spaced at weekly intervals. Between three and ten sequential batches are usually added.

Figure 4:
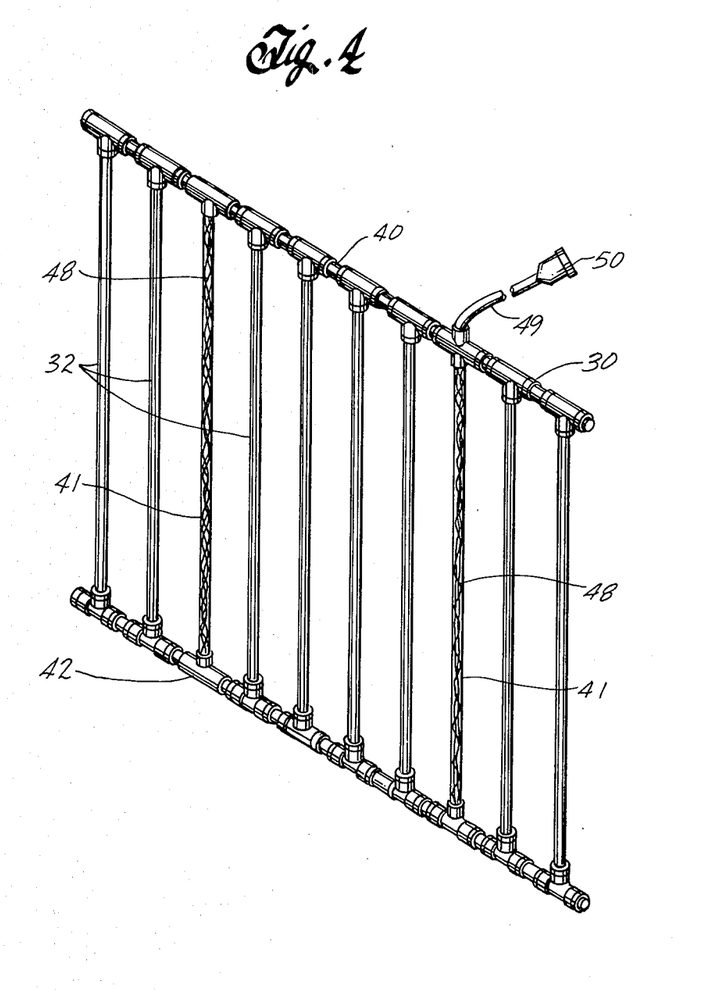
FIG. 4 is a perspective view of an immersible light system.

5. In order to maintain adequate photosynthesis to control carbon dioxide and ammonia below the levels herein specified, as well as to control concentrations of other possible toxicants; to provide in-situ production of antibiotic and other beneficial compounds; and to grow food for the settled animals; an input of approximately 1,500 watts of electric energy converted to light by fluorescent lamps is provided by means of the light racks 30. The submerged light sources are energized for approximately 18 hours per day, providing a six-hour per day dark period to obtain good plant growth.

6. In addition to the photosynthesis, good sanitation is provided by periodic air circulation within the tanks throughout the day, during which intermittent air flow is provided at alternate positions in the tank. This air flow has the further function of controlling oxygen levels at or just below saturation. Water is passed continuously through the tank at the rate of approximately one water turnover every eight hours, or at a rate of approximately four liters per minute in a tank of the dimensions described. The water introduced to the tank after the abalone have become established is filtered to remove particles and organisms at least larger than about 50 microns, and the water in the tank is maintained at a relative constant temperature preferably between about 16° C. and 18° C.

7. After approximately ten days from the time of the first introduction of the small *Navicula* diatoms, other diatoms and algae are fed two or three times per week. These diatoms must also be grown under controlled bacteriological conditions.

Under these conditions, with five batches of 100,000 larvae each added at weekly intervals, one can expect between 50,000 and 200,000 healthy juvenile abalone per tank after 60 days from the last introduction. With the introduction of 500,000 larvae (five batches of 100,000 each), this represents a survival of 10–40%, which is probably many orders of magnitude better than in the natural environment.

What is claimed is:

1. The process of culturing gastropod molluscs and other benthic motile marine and aquatic animals from the larval stage through infancy in a body of water in a growing tank having therein settlement surfaces upon which the larvae settle and the animals resulting from larvae metamorphosis live, which comprises:
   (a) conditioning the settlement surfaces to develop thereon a microbiological community so as to induce settlement of larvae and to support life thereon;
   (b) introducing larvae of the animal into the tank whereby at least a portion of the larvae will settle upon the settlement surfaces and undergo metamorphosis and subsequent growth;
   (c) circulating water in the tank at least periodically; and
   (d) controlling the biological and chemical balance in the tank to provide food and to limit the build-up of harmful components and conditions in the tank.

2. The process according to claim 1 in which the settlement surfaces are conditioned by circulating water over the surfaces for several days prior to the introduction of larvae.

3. The process according to claim 1 wherein the biological and chemical balance in the tank is controlled in part by removal of waste products from the tank.

4. The process according to claim 1 wherein previously metamorphosed animals of the same family are caused to reside on the settlement surfaces to at least partially effect the desired conditioning of such surfaces.

5. The process according to claim 1 in which larvae are added to the tank over a period of time so that later added larvae will benefit from the biological adjustment of the culturing environment to the earlier larvae additions.

6. The process according to claim 1 wherein the biological and chemical balance in the tank is controlled in part by inducing photosynthesis of algae therein.

7. The process according to claim 6 wherein photosynthesis is induced in the tank by injecting superambient light energy into the tank.

8. The process according to claim 6 wherein the biological and chemical balance in the tank is further controlled by adding nutrients to the water to support photosynthesis.

9. The process of culturing gastropod molluscs and other benthic motile marine animals from the larval stage through infancy in a body of seawater in a growing tank having therein settlement surfaces upon which the larvae settle and the animals resulting from larvae metamorphosis live and grow, which comprises:
   (a) circulating through the tank seawater which is free from excess components harmful to the larvae and young animal;
   (b) conditioning the settlement surfaces by developing thereon a microbiological community compatible with the settlement and metamorphosis of the larvae and the growth of the young animal;
   (c) introducing larvae to the tank;
   (d) controlling the biological and chemical balance in the tank to provide food and to limit the build-up of harmful components and conditions in the tank; and
   (e) continuing to circulate seawater at least periodically through the tank.

10. The process according to claim 9 in which control of the biological and chemical balance in the tank is accomplished at least in part by injecting light energy to induce a high degree of photosynthesis.

11. The process in accordance with claim 9 in which the water in the tank is maintained at a substantially constant predetermined temperature.

12. The process in accordance with claim 9 in which the seawater circulated through the tank is prefiltered to remove therefrom unwanted biological and particulate components therefrom.

13. The process in accordance with claim 9 in which the seawater circulated through the tank is treated to minimize the bacteria count therein.

14. The process in accordance with claim 9 in which the biological and chemical balance in the tank is controlled at least in part by adding algae to the tank.

15. The process according to claim 9 in which control of the biological and chemical balance in the tank is accomplished by:
   (a) injecting light energy to induce a high degree of photosynthesis;
   (b) adding plant nutrients to the tank; and
   (c) periodically bubbling air through the tank to induce water circulation therein and to add oxygen to the water.

16. The process according to claim 9 in which steps (a) and (b) are controlled so as to establish on the settlement surfaces a microbiological community in which the cells thereof are of a size between about 2 and about 10 microns and with an average cell spacing on the surfaces of about 10 to 50 microns.

17. The process according to claim 9 in which larvae are introduced to the tank over a period of time.

18. The process according to claim 9 in which control of the biological and chemical balance in the tank is accomplished at least in part by inducing water circulation within and through the tank to suspend and remove harmful waste products.

19. The process according to claim 18 wherein water circulation within the tank is induced by at least periodically bubbling air through the tank.

20. The process of culturing abalone from the larval stage through the infancy in a body of seawater in a growing tank having settlement surfaces therein upon which larvae settle and the animals resulting from larvae metamorphosis live and grow, which comprises:
  (a) circulating through the tank seawater which is free from excess components harmful to the larvae and young abalone;
  (b) conditioning the settlement surfaces by developing thereon a microbiological community compatible with the settlement and metamorphosis of the larvae and the growth of the young animal;
  (c) adding abalone larvae to the tank;
  (d) controlling the biological and chemical balance in the tank to provide food and to limit the build-up of harmful components and conditions in the tank; and
  (e) continuing to circulate seawater at least periodically through the tank to transport food across the settlement surfaces and to remove waste products from the tank.

21. The process according to claim 20 in which the larvae are added to the growing tank over a period of time.

22. The process according to claim 21 in which larvae are added to the growing tank in time-spaced increments of at least three separate batches.

23. The process of culturing abalone from the larval stage through infancy in a growing tank having therein means forming settlement surfaces upon which larvae settle and the animals resulting from larvae metamorphosis live and grow, which comprises:
  (a) circulating through the tank seawater which is free from excess components harmful to the larvae and young abalone;
  (b) conditioning the settlement surfaces by developing thereon a microbiological community compatible with the settlement and metamorphosis of the larvae and the growth of the young animal;
  (c) adding abalone larvae to the tank while they are still in the swimming phase;
  (d) inducing a high degree of photosynthesis in the tank to effect the growth of food products and to limit the build-up of harmful components and conditions in the tank;
  (e) adding plant nutrients to support photosynthesis; and
  (f) continuing to circulate seawater at least periodically to transport food and plant nutrients across the settlement surfaces and to remove waste products from the tank.

24. The process according to claim 23 in which photosynthesis is induced by supplying light energy to the contents of the tank by means of a plurality of light sources immersed in the tank.

25. The process according to claim 23 wherein the nutrients added in step (e) thereof include trace metals, vitamins and chelating agents.

26. The process according to claim 23 in which steps (d), (e) and (f) are controlled to limit the concentration of ammonia to less than about 50 ppb and to maintain a pH above about 7.8.

27. The process according to claim 23 in which abalone larvae are added to the tank in successive increments over a period of time.

28. The process according to claim 23 wherein bacteria and protozoa are added to the circulating seawater at or about the time of addition of larvae thereto to insure development of the microbiological community on the settlement surfaces.

29. The process according to claim 23 wherein the ammonia concentration is less than approximately 50 ppb.

30. The process according to claim 23 wherein the light energy supplied to the tank consists of a mixture of spectra including at least about 15% of spectra in the range of 430 to 490 nanometers.

31. The process according to claim 30 wherein the light energy supplied to the tank is provided by fluorescent lamps of "Daylight" type.

32. The process according to claim 23 wherein the nutrients added in step (e) thereof include nitrates, phosphates and silica.

33. The process according to claim 32 wherein the nutrients are added to maintain ionic concentration substantially as follows:
  nitrogen: greater than 5 microgram-atoms per liter of seawater
  phosphorus: greater than 1 microgram-atoms per liter of seawater
  silicon: greater than 5 microgram-atoms per liter of seawater.

34. The process of culturing abalone from the larval stage through infancy in a body of seawater in a growing tank having therein means forming settlement surfaces upon which larvae settle and the animals resulting from larvae metamorphosis live and grow, which comprises:
  (a) circulating through the tank seawater which is free from excess components harmful to the larvae and young abalone;
  (b) conditioning the settlement surfaces by developing thereon a microbiological community compatible with the settlement and metamorphosis of the larvae and the growth of the young animal;
  (c) adding abalone larvae to the tank;
  (d) adding algae to the seawater to provide food and photosynthesis;
  (e) controlling the biological and chemical balance in the tank to provide food and to limit the build-up of harmful components and conditions in the tank; and
  (f) continuing to circulate seawater at least periodically through the tank to transport food across the settlement surfaces and to remove waste products from the tank.

35. The process in accordance with claim 34 in which the algae added to the tank are diatoms of not more than about 10 microns in size.

36. The process in accordance with claim 34 in which the algae are added to the tank in sufficient quantity to settle on the settlement surfaces with an average spacing of about 10 to 50 microns.

37. The process according to claim 23 wherein light and nutrient are added to support photosynthesis of the algae.

38. The process in accordance with claim 34 in which the algae added to the seawater are obtained by artificial culturing under controlled conditions.

39. The process in accordance with claim 38 in which conditions are controlled to minimize the number of species and concentration of bacteria in the cultured algae.

40. The process in accordance with claim 38 in which the algae added to the seawater are predominantly a diatom species selected from the class benthic diatoms.

41. The process in accordance with claim 40 in which the algae added to the seawater are predominantly Navicula.

42. The process of culturing abalone from the larval stage through infancy in a body of seawater in a growing tank having therein means forming settlement surfaces upon which larvae settle and the animals resulting from larvae metamorphosis live and grow, which comprises:
   (a) conditioning seawater to remove substantially all components harmful to the larvae and young abalone and circulating the conditioned seawater through the tank;
   (b) conditioning the settlement surfaces by developing thereon a microbiological community compatible with the settlement and metamorphosis of the larvae and the growth of the young animal;
   (c) adding abalone larvae to the tank;
   (d) controlling the biological and chemical balance in the tank to provide food and to limit the build-up of harmful components and conditions in the tank; and
   (e) continuing to circulate seawater at least periodically through the tank to transport nutrients across the settlement surfaces and to remove waste products from the tank.

43. The process according to claim 42 wherein the seawater is conditioned by filtering therefrom substantially all matter in excess of at least about 30 microns in size.

44. The process according to claim 42 wherein the seawater is conditioned by exposing it to means to reduce the bacteria population below about 100 cells per milliliter of water.

45. The process according to claim 42 wherein the seawater is conditioned by:
   (a) filtering therefrom substantially all matter in excess of about 10 microns in size; and
   (b) exposing the filtered water to ultraviolet light to reduce the bacteria population below about 100 cells per milliliter of water.

46. The process according to claim 42 in which the seawater is conditioned to a substantially constant temperature.

47. The process of culturing abalone from the larval stage through infancy in a body of seawater in a growing tank having therein means forming settlement surfaces upon which larvae settle and the animals resulting from metamorphosis live and grow, which comprises:
   (a) conditioning seawater to remove therefrom all components greater than about 30 microns in size and to reduce the bacteria population below about 100 cells per milliliter of water;
   (b) maintaining the water at a predetermined substantially constant temperature;
   (c) circulating the conditioned, constant-temperature water through the tank for a period of days prior to the addition of larvae;
   (d) adding abalone larvae to the tank in successive increments over a period of time;
   (e) periodically adding algae and plant nutrients to the tank;
   (f) injecting light energy into the water bath for at least a portion of each 24-hour period to stimulate photosynthesis therein; and
   (g) continuing to circulate seawater in and through the tank for a substantial part of each 24-hour period to transport food and nutrients across the settlement surfaces and to remove waste products from the tank.

48. The process according to claim 47 wherein air is bubbled into the water in the tank at such a rate and frequency to maintain the oxygen concentration in the water between about 75% and 100% of saturation.

49. The process according to claim 47 wherein a quantity of bacteria and protozoa are added to the water in the tank prior to the introduction of larvae.

50. The process of culturing abalone from the larval swimming stage through larval settlement in a body of seawater in a growing tank during which period larvae discontinue swimming and settle on submerged settlement surfaces in the growing tank, which comprises:
   (a) circulating in the tank seawater which is free from excess components harmful to the larvae;
   (b) conditioning the settlement surfaces by developing thereon a microbiological community compatible with the settlement of the larvae;
   (c) adding abalone larvae to the tank; and
   (d) controlling the biological and chemical balance in the tank to limit the build-up of components detrimental to the settlement of the larvae.

51. The process according to claim 50 in which the settlement surfaces are conditioned in part for settlement of larvae thereon by placing a plurality of already metamorphosed abalone on the surfaces for a period of time prior to introduction of the larvae.

52. The process according to claim 50 in which one or more species of bacteria and protozoa are added to the seawater to establish microbiological communities on the settlement surfaces.

53. The process according to claim 50 in which steps (a) and (b) are controlled so as to establish on the settlement surfaces a microbiological community in which the cells thereof are of a size between about 2 and about 10 microns and with an average cell spacing on the surfaces of about 10 to 50 microns.

54. The process according to claim 50 wherein the biological and chemical balance in the tank is controlled to limit the concentration of ammonia to less than about 50 ppb, to maintain a pH above about 7.8 and to control the concentration of dissolved oxygen between about 75% and 100% of saturation.

55. The process according to claim 50 wherein water is circulated through the tank to remove waste products therefrom.

56. The process according to claim 50 wherein the ammonia concentration is less than approximately 50 ppb.

57. The process in accordance with claim 50 in which the seawater circulated in the tank has been treated to remove therefrom all particles in excess of about 30 microns in size and to reduce the bacteria count therein to below about 100 cells per milliliter of water.

58. The process according to claim 57 in which the treated seawater is circulated in the tank for a period of days.

59. The process according to claim 50 in which larvae are added to the tank over a period of time so that later added larvae will benefit from the biological adjustment of the culturing environment to the earlier larvae additions.

60. The process according to claim 59 in which larvae are added to the growing tank in at least three separate batches at time intervals of several days between batches.

61. The process according to claim 50 wherein the biological and chemical balance in the tank is controlled in part by injecting light energy into the water for at least a part of every 24-hour period.

62. The process according to claim 61 wherein algae are added to the water to provide with the injected light photosynthetic removal of harmful components from the water.

63. The process according to claim 62 wherein plant nutrients are added to the water together with the algae to further support photosynthesis.

64. The process of culturing abalone during the first few weeks after larval settlement in a body of seawater in a growing tank having therein settlement surfaces on which larvae have settled, which comprises:
 (a) conditioning seawater to remove substantially all impurities harmful to the young abalone and circulating the conditioned seawater in the tank;
 (b) maintaining on the settlement surfaces a microbiological community compatible with the growth of the young animals;
 (c) controlling the biological and chemical balance in the tank to provide food and to limit the build-up of harmful components and conditions in the tank; and
 (d) continuing to circulate seawater at least periodically in the tank.

65. The process in accordance with claim 64 in which the seawater circulated in the tank has been treated to remove therefrom all particles in excess of about 30 microns in size to reduce the bacteria count therein to below about 100 cells per milliliter of water.

66. The process in accordance with claim 64 in which the water in the tank is maintained at a substantially constant predetermined temperature.

67. The process according to claim 64 wherein water circulation within the tank is induced by periodically bubbling air through the tank to effect circulation to maintain the oxygen concentration in the water between about 75% and 100% of saturation.

68. The process according to claim 64 wherein algae are added to the water as food and by photosynthesis to remove harmful components from the water.

69. The process according to claim 64 wherein the biological and chemical balance in the tank is controlled in part by removing waste products therefrom.

70. The process according to claim 64 wherein the seawater is conditioned by:
 (a) filtering therefrom substantially all matter in excess of about 30 microns in size;
 (b) exposing the filtered water to ultraviolet light to reduce the bacteria population below about 100 cells per milliliter of water; and
 (c) bringing the filtered and sterilized water to a predetermined substantially constant temperature.

71. The process according to claim 64 wherein the biological and chemical balance in the tank is controlled to limit the concentration of ammonia to less than 50 ppb, to maintain a pH above about 7.8 and to control the concentration of dissolved oxygen between about 75% and 100% of saturation.

72. The process according to claim 64 wherein the ammonia concentration is less than approximately 50 ppb.

73. The process according to claim 64 wherein the biological and chemical balance in the tank is controlled in part by inducing photosynthesis therein.

74. The process according to claim 73 wherein the biological and chemical balance in the tank is further controlled by adding nutrients to the water therein to support photosynthesis.

* * * * *

UNITED STATES PATENT AND TRADEMARK OFFICE
CERTIFICATE OF CORRECTION

PATENT NO. : 4,226,210

DATED : October 7, 1980

INVENTOR(S) : GEORGE S. LOCKWOOD ET AL

It is certified that error appears in the above-identified patent and that said Letters Patent are hereby corrected as shown below:

Column 8, line 42, "and" should be -- in --.
Column 12, line 47, "nd" should be -- and --.
Column 13, line 25, "desired" should be -- described --.
Column 13, line 50, "period" should be -- periodic --.
Column 13, line 54, "and" should be -- of --.
Column 17, line 26, after "infancy" insert -- in a body of seawater --.

Signed and Sealed this

Twenty-seventh Day of January 1981

[SEAL]

Attest:

RENE D. TEGTMEYER

Attesting Officer

Acting Commissioner of Patents and Trademarks